United States Patent
Bellmore et al.

(10) Patent No.: US 11,968,243 B2
(45) Date of Patent: Apr. 23, 2024

(54) CONTAINERIZED CROSS-DOMAIN SOLUTION

(71) Applicants: Mark A. Bellmore, Melbourne, FL (US); Matthew T. Kirk, West Melbourne, FL (US); David M. Iodice, Melbourne, FL (US)

(72) Inventors: Mark A. Bellmore, Melbourne, FL (US); Matthew T. Kirk, West Melbourne, FL (US); David M. Iodice, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 569 days.

(21) Appl. No.: 17/352,711

(22) Filed: Jun. 21, 2021

(65) Prior Publication Data
US 2022/0407894 A1    Dec. 22, 2022

(51) Int. Cl.
*H04L 29/06* (2006.01)
*G06F 16/245* (2019.01)
(Continued)

(52) U.S. Cl.
CPC .......... *H04L 63/205* (2013.01); *G06F 16/245* (2019.01); *H04L 49/25* (2013.01); *H04L 63/0245* (2013.01)

(58) Field of Classification Search
None
See application file for complete search history.

(56) References Cited

U.S. PATENT DOCUMENTS 10,999,262 B1 *   5/2021   Ramanujan ......... H04L 63/0485
11,070,488 B2 *   7/2021   You ....................... H04L 47/785
(Continued)

FOREIGN PATENT DOCUMENTS

EP    2871814 A1    5/2015
EP    3617879 A1    3/2020

OTHER PUBLICATIONS

K. Suo, Y. Zhao, W. Chen and J. Rao, "An Analysis and Empirical Study of Container Networks," (Year: 2018).*
(Continued)

*Primary Examiner* — Jeffery L Williams
(74) *Attorney, Agent, or Firm* — Tarolli, Sundheim, Covell & Tummino LLP

(57) ABSTRACT

A containerized cross-domain solution (CDS) is disclosed herein. In some examples, a first network interface container can be executed on a server to run a first network interface application to receive a data packet that includes data generated by a first process executing at a first security domain. A filter container can be executed on the server to run a data filter to evaluate a data content of the data to determine whether the data content violates a set of data rules. A second network interface container can be executed on the server to run a second network interface application. The data packet can be provided to the second network interface application in response to determining that the data content does not violates the set of data rules. The second network interface application can provide the data packet to a second security domain for a second process executing therein.

20 Claims, 4 Drawing Sheets

(51) Int. Cl.
*H04L 9/40* (2022.01)
*H04L 49/25* (2022.01)

(56) References Cited

U.S. PATENT DOCUMENTS

| | | | | |
|---|---|---|---|---|
| 11,537,425 | B2* | 12/2022 | Worsley | H04L 47/2475 |
| 11,599,626 | B1* | 3/2023 | Hartley | H04L 63/105 |
| 2012/0151209 | A1 | 6/2012 | Visnyak et al. | |
| 2015/0153824 | A9* | 6/2015 | Hall | G06Q 30/02 |
| | | | | 715/753 |
| 2019/0173736 | A1* | 6/2019 | Ponnuswamy | H04L 41/145 |
| 2019/0386957 | A1 | 12/2019 | Leon | |
| 2020/0073692 | A1* | 3/2020 | Rao | H04L 12/4633 |
| 2020/0099658 | A1 | 3/2020 | Couillard et al. | |
| 2021/0058327 | A1* | 2/2021 | Mariappan | H04L 41/5025 |
| 2021/0234898 | A1* | 7/2021 | Desai | H04L 63/104 |
| 2022/0329671 | A1* | 10/2022 | Shilawat | H04L 63/0263 |
| 2022/0407894 | A1* | 12/2022 | Bellmore | H04L 63/0236 |
| 2023/0079209 | A1* | 3/2023 | Nallamothu | H04L 45/745 |
| | | | | 709/238 |
| 2024/0031236 | A1* | 1/2024 | Thyagaturu | H04L 61/5014 |

OTHER PUBLICATIONS

A. Mousa, W. Tuffaha, M. Abdulhaq, M. Qadry and O. O. M.M., "In-Depth Network Security for Docker Containers," (Year: 2023).*
Goethals, et al.: "FUSE: a Microservice Approach to Cross-domain Federation Using Docker Containers"; found on the internet Feb. 17, 2021 at: https://biblio.ugent.be/publication/8615962/file/8615966 Lessons Learned Developing Cross-Domain Solutions on SELinux.
Nguyen, et al.: "A Cloud-Oriented Cross-Domain Security Architecture"; The 2010 Military Communications Conference—Unclassified Program-Cyber Security and Network Management; found on the internet Feb. 17, 2021 at: https://ieeexplore.ieee.org/abstract/document/5680360.
Sellers, et al.: "Lessons Learned Developing Cross-Domain Solutions on SELinux"; found on the internet Feb. 17, 2021 at: http://selinuxsymposium.org/2006/slides/07-cds.pdf, pp. 1-18.
Dahlstrom, et al: "Hardening Containers for Cross-Domain Applications", Milcom 2019—2019 IEEE Military Communications Conference (Milcom), IEEE, Nov. 12, 2019 (Nov. 12, 2019), pp. 1-6, XP033733548, DOI:10.1109/MILCOM47813.2019.9020992 [retrieved on Mar. 2, 2020] the whole document.
International Search Report for corresponding PCT/US2022-030809 dated Sep. 12, 2022.

* cited by examiner

CONTAINERIZED CROSS-DOMAIN SOLUTION

TECHNICAL FIELD

The present disclosure relates to a containerized cross-domain solution (CDS).

BACKGROUND

A CDS is an integrated information assurance system that provides the ability to access, restrict, or transfer information between two or more security domains. A CDS may be one-way only (from a low to a high domain or from a high to a low domain) or may be two-way. CDSs are intended to prevent the cross-contamination of sensitive data not permitted between domains, prevent transmission of malicious content, and prevent covert channels. Thus, CDSs are designed to enforce domain separation and typically include some form of content filtering, which is used to designate information that is unauthorized for transfer between security domains or levels of classification, such as between different military divisions, intelligence agencies, or other operations which critically depend on the timely sharing of potentially sensitive information.

The goal of a CDS is to allow a trusted network domain to exchange information with other domains, either one-way or bidirectional, without introducing the potential for security threats that would normally come with network connectivity. Although the goal is 100% assurance, this is not possible in practice, thus CDS development, assessment, and deployment are based on comprehensive risk management. Due to the sensitive nature of their use, every aspect of an accredited CDS must be rigorously evaluated under a security standard, such as Lab-Based Security Assessment (LBSA) in order to reduce the potential vulnerabilities and risks to the system itself and those to which it will be deployed. The evaluation and accreditation of CDSs in the United States are primarily under the authority of the National Cross Domain Strategy and Management Office (NCDSMO) within the National Security Agency (NSA).

SUMMARY

The present disclosure relates to a containerized CDS.

In an example, a computer-implemented method can include receiving, at a first network interface application, a data packet generated at a first security domain. A first network interface container can be executed to run the network interface application, and the data packet can include data generated by a first process executing at the first security domain. The computer-implemented method can include evaluating, at a data filter, a data content of the data to determine whether the data has been compromised. A filter container can be executed to run the data filter. The computer-implemented method can include providing, at the data filter, the data packet to a second network interface application in response to determining that the data has not been compromised. A second network interface container can be executed to run the second network interface application. The computer-implemented method can include providing, at the second network interface application, the data packet to a second security domain for a second process executing at the second security domain.

In yet another example, a system can include memory to store machine-readable instructions representative of a cross domain router for communicating data packets between first and second security domains and data that can include a content data rule database that can include a set of data rules for determining whether data within one or more data packets has been compromised. The system can include one or more processors to access the memory and execute the machine-readable instructions to execute a first network interface container to run a first network interface application, a second network interface container to run a second network interface application, and a filter container to run a data filter. The first network interface application can be programmed to receive a data packet generated at the first security domain. The data packet can include data generated by a first process executing at the first security domain. The data filter can be programmed to query the content data rule database to retrieve the set of data rules and provide the data packet to the second network interface application in response to determining that a data content of the data does not violate the set of data rules. The second network interface application can be programmed to provide the data packet to the second security domain for a second process executing at the second security domain.

In a further example, a computer-implemented method can include executing a first network interface container on a cross domain interface (CDI) server to run a first network interface application. The first network interface application can be programmed to receive a data packet generated at a first security domain from a first network. The data packet can include data generated by a first process executing at the first security domain. The computer-implemented method can include executing a filter container on the CDI server to run data filter. The data filter can be programmed to query a content data rule database located outside the filter container on the CDI server to retrieve a set of data rules and determine whether a data content of the data of the data packet has been compromised based on the set of data rules. The computer-implemented method can include executing a second network interface container on the CDI server to run a second network interface application. The second network interface application can be programmed to provide the data packet to a second security domain over a second network for a second process executing at the second security domain.

DETAILED DESCRIPTION

Figure 1:
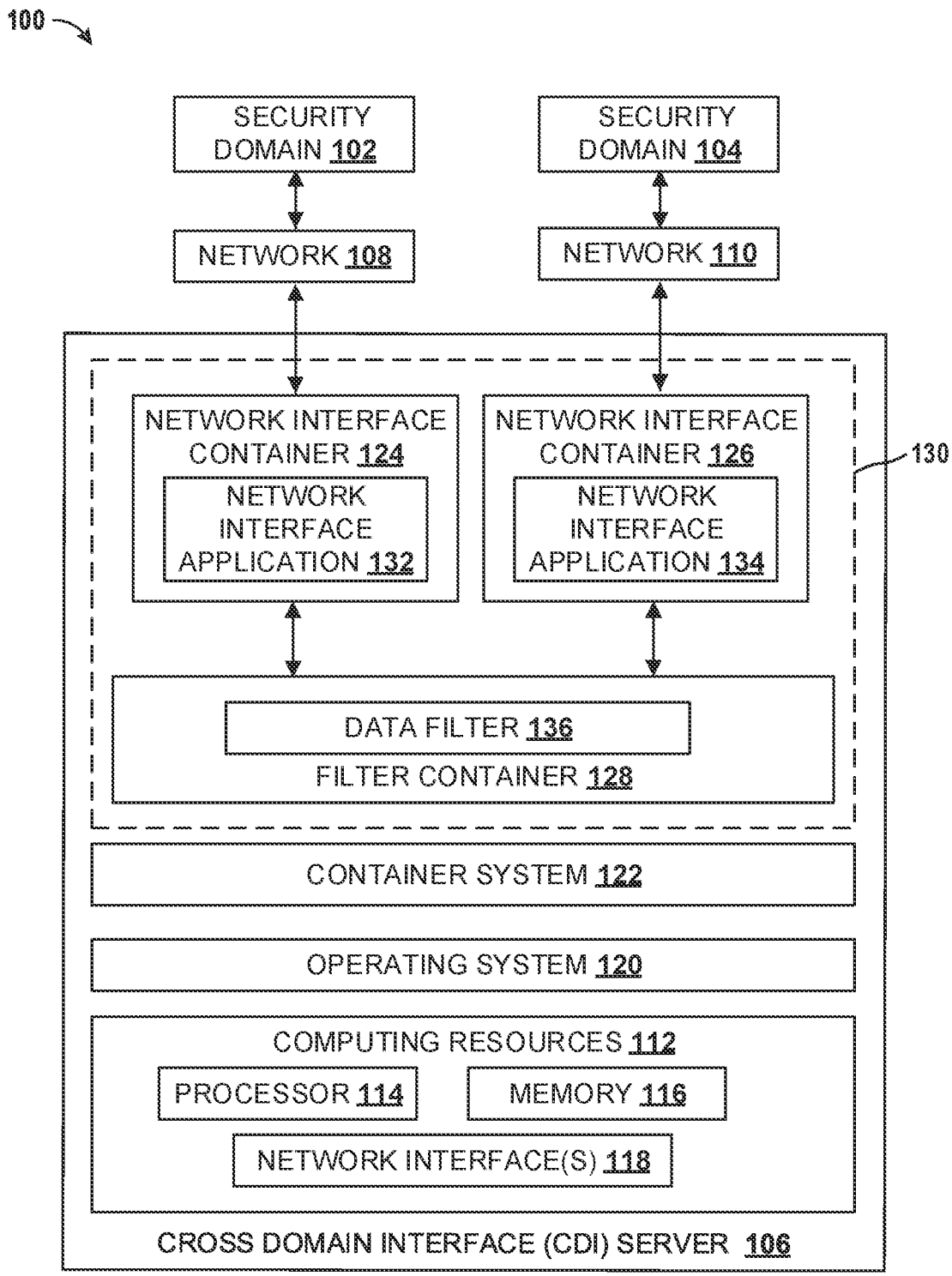
FIG. 1 is an example of a CDS system.

The present disclosure relates to a containerized CDS. Existing CDS rely on hardware-based implementations that are not only cost prohibitive but prohibit scaling to larger environments. Thus, as more networks become involved in a CDS, resource requirements grow larger, and hardware-based CDSs often become a bottleneck of an entire data or enterprise system. Moreover, hardware-based CDS(s) can grow exponentially as additional networks are incorporated, and it can become difficult to recertify as hardware-based CDSs cannot keep up with evolving technical requirements fast enough due to a lengthy and time-consuming process of CDS certification. For example, for a hardware-based CDS to comply with a security standard (e.g., as set forth by a government agency), the hardware-based CDS must go through a formal verification or certification process, which is time extensive and laboring. Thus, if the hardware-based CDS is modified (e.g., updated), the hardware-based CDS must be recertified according to the security standard to confirm that the modified hardware-based CDS is secure.

Systems and methods are disclosed herein that provide a containerized CDS that allows for scaling of security domains and efficient certification of cross domain resources. By having a software-based CDS implemented in containers, removes the hardware constraints presented by existing CDSs. Moreover, the systems and methods disclosed herein enable CDS to be recertified more effectively as a certified container no longer needs to be recertified. The systems and methods disclosed herein provide for a cost-effective and portable CDS that can be scaled to meet a user or entity's needs and thus is no longer is limited or restrained to a particular set of hardware as existing CDS. Moreover, the systems and methods disclosed herein eliminate the need for dedicated personnel for installation and updates and thus recertification of the CDS. Because the systems and methods disclosed herein separate containerized processes into microservices, constant recertification of the CDS is no longer needed, as container images can remain unchanged and access external rules that can be modified (e.g., updated, changed, etc.) via an external program or a user.

In some examples, a CDI server can be configured to employ a cross domain router. The cross domain router can be represented as coded instructions that can be executed on the CDI server to facilitate an exchange of data between two or more security domains, and thus movement of the data between the security domains. The cross domain router can include a first network interface container, a second network interface container, and a filter container. The network interface containers can be executed to run respective first and second network interface applications. The filter container can be executed to run a data filter. Each of the first and second network interface applications and the data filter can be configured to cooperate to facilitate the transfer of the data between respective security domains.

The first network interface application can be configured to include a first set of network rules for evaluation of one or more data packets that are generated at a first security domain. The one or more data packets can include data generated by a first process (e.g., application or service) executing on a node of the first security domain. The first network interface application can be configured to provide the one or more data packets to the data filter in response to determining that the one or more data packets do not violate the first set of network rules. The data filter can include a set of data rules for evaluation of data content. The data filter can be configured to retrieve the set of data rules from a content data rule database that is located outside the cross domain router. The set of data rules can be applied to the data within the one or more data packets to determine whether the data has been compromised. Thus, the data filter can be employed to examine the data content of the data for malware, unwanted code and/or data.

In some examples, the data filter can be configured to provide the one or data packets with the data to the second network interface application in response to determining that the data is not compromised based on the set of data rules. The second network interface application can be configured to include a second set of network rules for evaluation of the one or more data packets that are generated at the first security domain. The second network interface application can be configured to provide the one or more data packets to the second domain in response to determining that the one or more data packets do not violate the second set of network rules. Accordingly, the CDI server enables processes (e.g., application or services) executing on different security domains having different security levels to communicate data between each other securely. Moreover, because the cross domain router uses containers for data routing between the security domains an overall power consumption and computational cost at the CDI server can be reduced. Furthermore, implementing the cross domain router on the CDI server is relatively low-cost compared to hardware-based CDS, highly scalable, and can support any number of security domains.

FIG. 1 is an example of a CDS system 100. The CDS system 100 can be configured to transfer data between two or more security domains, such as first and second security domains 102 and 104. In some examples, each of the first and second security domains 102 and 104 can be referred to as a security enclave. Each of the first and second security domains 102 and 104 can be implemented on physical hardware, such as computing resources, as disclosed herein. In some examples, each of the first and second security domains 102 and 104 can be implemented on similar physical hardware. Each of the first and second security domains 102 and 104 can include a plurality of physical or virtual computers that can be networked together and referred to as nodes. The nodes can be implemented on respective physical hardware. In some examples, the nodes are virtual nodes that can exist on a hypervisor on similar physical hardware. In further examples, the physical and virtual nodes can be implemented on similar physical hardware or across one or more different hardware systems. Each of the first and second security domains 102 and 104 can be physically separate security domains or logically separate security domains existing on the same physical hardware. The first and second security domains 102 and 104 can have different security levels. For example, the first and second security domains 102 and 104 can have differing government security levels, such as unrestricted, restricted, confidential, classified, unclassified, secret, and top secret.

Each of the first and second security domains 102 and 104 can communicate with a CDI server 106. In some examples, the CDI server 106 can be referred to as a node. The CDI server 106 can be configured to facilitate a movement of the data between the first and second security domains 102 and 104. The CDI server 106 can pass the data through one or more filters, which can be configured to evaluate the data relative to one or more data rules to determine whether the data should be routed to an intended security domain, as disclosed herein. By employing the CDI server 106 for communication of the data between the first and second security domains 102 and 104, cross domain contamination of sensitive data can be minimized or eliminated, reduce or eliminate a likelihood that malicious content is transmitted, or prevent covert channels.

The first security domain 102 can be configured to communicate over a first network 108 with the CDI server 106, and the second security domain 104 can be configured to communicate over a second network 110 with the CDI server 106. In some examples, the first security domain 102 can include the first network 108. In additional or alternative examples, the second security domain 104 can include the second network 110. Each network 108 and 110 can be a physical network or a virtual network. For example, if one or more virtual nodes within each of the first and second security domains 102 and 104 are implemented in respective virtualization environments (e.g., virtual machines), the networks 108 and 110 can be implemented as virtual networks and can be configured to enable the one or more virtual nodes to communicate with the CDI server 106. In further examples, each network 108 and 110 is a physical network such as a wireless (e.g., local area network (LAN) wireless network, cellular network, etc.) and/or wired network (e.g., digital subscriber line (DSL), cable line, fiber optic line, etc.). In some examples, each of the first and second networks 108 and 110 include electrical cables (e.g., coaxial, Ethernet, telephone line, etc.) and/or optical cables. Each of the first and second security domains 102 and 104 can include a respective network interface (not shown in FIG. 1) to enable one or more nodes of each security domain 102 and 104 to communicate with the CDI server 106.

By way of example, the one or more nodes within each of the first and second security domains 102 and 104 can provide a software environment for implementing one or more processes, such as services and/or applications. In some examples, a first process executing on a first node of the first security domain 102 can be configured to communicate data to a second process executing on a second node of the second security domain 104 through the CDI server 106, as disclosed herein. In some examples, the second process can be programmed to communicate the data to the first node through the CDI server 106, as disclosed herein. The CDI server 106 can be employed for routing the data between the first and second security domains 102 and 104. The data can include a file, an application, service data, a script, sensor data, image data, or other types of data. In some examples, the data can include user-generated data. In some examples, the data is mission-critical data, and at least one of the first and second processes can be configured to generate messages that include the mission-critical data for routing to another process in a different security domain. The first and second processes can be configured to automatically and/or manually send the data to the CDI server 106. In some examples, the CDI server 106 can be configured to poll at least one of the first and second processes to retrieve the data intended for another process. For example, at least one of the first and second processes can be configured to store the data at the node (e.g., within a particular folder) in a respective security domain that the CDI server 106 can access over one of the first and second networks 108 and 110 for communicating to another application residing in a different security domain.

The CDI server 106 can include computing resources 112. The computing resources 112 can include a processor 114 and memory 116. The memory 116 can store machine-readable instructions that can be retrieved and executed by the processor 114 for container virtualization and processing/routing of the data, as disclosed herein. By way of example, the memory 116 can be implemented, for example, as a non-transitory computer storage medium, such as volatile memory (e.g., random access memory), non-volatile memory (e.g., a hard disk drive, a solid-state drive, a flash memory, or the like), or a combination thereof. The processor 114 could be implemented, for example, as one or more processor cores. In the present example, although the components of the CDI server 106 are illustrated as being implemented on a single server, in other examples, the components could be distributed across different servers (e.g., computers, devices, etc.) and communicate, for example, over a network (e.g., a wireless and/or wired network). In some examples, the CDI server 106 can be implemented in a clouding computing environment. The cloud computing environment can include one or more processing units (e.g., servers). Other components of a cloud computing environment include storage devices, networking devices (e.g., switches), etc.

In some examples, the computing resources 112 include one or more network interfaces 118. For clarity and brevity purposes other elements of the computing resources 112 have been omitted. The one or more network interfaces 118 can include a communication device, such as a transmitter, a receiver, a transceiver, a modem, and/or a network interface card to facilitate the movement of the data between the first and second security domains 102 and 104. For example, a first network interface of the one or more network interfaces 118 can be coupled to the network 108, and a second network interface of the one or more network interfaces 118 can be coupled to the second network 110. The first network interface can be configured to facilitate the movement of the data between the CDI server 106 and the first security domain 102. The second network interface can be configured to facilitate the movement of the data between the CDI server 106 and the second security domain 104.

The memory 116 can include an operating system 120. The operating system 120 can be stored as coded instructions (e.g., computer and/or machine readable instructions) within the memory 116 and executed by the processor 114. The operating system 120 can be programmed to support a container system 122. By way of example, the operating system 120 can be Linux®, Microsoft Windows®, Apple OS X®, or any operating system that supports virtual containerization. While the container system 122 in the example of FIG. 1 is implemented on the CDI server 106, in other examples, the container system 122 can be implemented using, for example, a personal computer, a mobile phone (e.g., a cell phone, a smartphone, etc.), a tablet computer, or any other type of computing device. The container system 122 can be programmed to allocate resources of the CDI server 106 for containers, such as network interface containers 124 and 126, and filter container 128 that can collectively be configured to cooperate to define or form a cross domain router 130, as shown in FIG. 1. The cross domain router 130 can be programmed to control a flow of information between the first and second security domains 102 and 104. The network interface containers 124 and 126, and filter container 128 can be stored as coded instructions (e.g., computer and/or machine readable instructions) within the memory 116 and executed by the processor 114 to control the flow of the information between the first and second security domains 102 and 104.

In some examples, the container system 122 can employ a pod, and the pod can include the network interface containers 124 and 126, and the filter container 128. For example, the network interface containers 124 and 126, and the filter container 128 can be assembled into the pod. By way of example, the pod can be a Kubernetes pod, or another type of pod. The pod can be configured to host an instance of each process (e.g., application or service) contained with each container 124, 126, and 128. Because the containers 124, 126, and 128 are located within a same pod, the containers 124, 126, and 128 can be co-scheduled in a shared context on the CDI server 106.

The network interface containers 124 and 126, and the filter container 128 execute respective containerized processes, as disclosed herein. In computing environments, a container is a virtual structure used to run an isolated instance of an application or service in a host environment, such as the CDI server 106. A container virtualizes at an operating system level by abstracting (e.g., isolating) the application or service from the operating system, such as the operating system 120. For example, an application or service executing in a container can be isolated from an application or service executing on the CDI server 106 or in other containers.

In some examples, the operating system 120 can be programmed (e.g., using a customized kernel) to provide isolation and resource management for processes that execute within the CDI server 106 (e.g., applications or services that execute on the host operating system). The isolation of the processes is known as a container. Thus, the network interface containers 124 and 126, and the filter container 128 in the example of FIG. 1 share the operating system 120. Thus, a process executing within a respective container is isolated from other processes executing within respective containers on the operating system 120. Example operating system virtualization environments can include Linux Containers LXC and LXD, Docker™, OpenVZ™, etc. The network interface containers 124 and 126, and the filter container 128 can be programmed to run directly from an operating system in a container without a hypervisor layer or dedicated memory, disk space, or processors. As such, the CDS containerized approach disclosed herein does not require a virtual machine to be implemented at the CDI server 106. As such, coded instructions (e.g., computer and/or machine readable instructions) representative of the container system 122 can interface to resources of the CDI server 106 without a hypervisor, and the coded instructions can interface to resources of the CDI server 106 without reliance on any particular operating system configuration.

By way of example, during operation (e.g., run time), the network interface containers 124 and 126 can be executed to run respective first and second network interface applications 132 and 134. The filter container 128 can be executed to run a data filter 136. Each of the first and second network interface applications 132 and 134 can be programmed to facilitate communication of the data to and from respective security domains 102 and 104. For example, the first network interface application 132 can be programmed to receive the data generated by the first process executing at the first security domain 102. The data generated by the first process can be received at the first network interface of the one or more network interfaces 118. The first network interface container 124 can include a first set of network rules for whitelisting traffic between services and/or applications. The first network interface application 132 can be programmed to process the data based on the first set of network rules. In some examples, the data generated by the second process can be received at the second network interface of the one or more network interfaces 118. The second network interface container 126 can include a second set of network rules for whitelisting traffic between services and/or applications. The second network interface application 134 can be programmed to process the data based on the second set of network rules. Each of the first and second network interface applications 132 and 134 can be programmed to enforce respective network rules, such that no rogue services executing in a respective security domain publish messages to other applications or services executing on a different security domain.

In some examples, the first and second network interface applications 132 and 134 are implemented as layer 3 proxy containers and can be configured to support layer 3 protocols. By way of example, the data generated by the first process can be packetized at the first security domain 102 and transmitted over the first network 108 to the CDI server 106. The first network interface of the network interfaces 118 can be configured to receive the packetized data. The packetized data can include header information, internet protocol (IP) information, the data, and other information. Each segment of the packetized data can have an assigned source and destination IP address. The first network interface application 132 can be programmed to evaluate the packetized data relative to the first set of network rules to determine whether the packetized data violates any of the first set of network rules. In some examples, the packetized data includes a data label and the first set of network rules include one or more label rules. The first network interface application 132 can be programmed to evaluate the data label relative to the one or more label rules to determine whether the data label matches a data label of the one or more label rules. The first network interface application 132 can be programmed to provide the data to the data filter 136 in response to determining that the data label for the data matches the data label of the one or more label rules. In some examples, the first network interface application 132 can be programmed to deny passing of the data to the data filter 136 in response to determining that the data label for the data does not match the data label of the one or more label rules.

The data filter 136 can be programmed to apply the packetized data to a set of data rules to determine whether the data of the packetized data violates one or more rules of the set of data rules. In some examples, the set of data rules are located outside the filter container 128 in volume that the data filter 136 can be programmed to access for processing of the data. In some examples, the set of data rules are stored at a content data rule database. The data filter 136 can be programmed to provide the packetized data to the second network interface application 134 in response to determining that the data does not violate the set of data rules. In other examples, the data filter 136 can be programmed to deny passing of the packetized data to the second network interface application 134 in response to determining that the data violates at least one data rule of the set of data rules.

In some examples, the second network interface application 134 can be programmed to receive the packetized data from the data filter 136. The second network interface application 134 can be programmed to transmit the packetized data via the second network interface of the network interfaces 118 over the second network 110 to the second security domain 104. In some examples, the second network interface application 134 can be programmed to evaluate the packetized data relative to the second set of network rules to determine whether the packetized data violates any of the second set of network rules. The second network interface application 134 can be programmed to transmit the packetized data to the second security domain 104 in response to determining that the packetized data does not violate any of the second set of network rules. The second security domain 104 can be configured to extract the data from one or more packets and provide the extract data to the second process for use thereof.

In some examples, the content data rule database can be programmed to receive an updated set of data rules based on user input data. The data filter 136 can be programmed to query the content data rule database to retrieve the updated set of data rules for determining data with the packetized data (or subsequent packetized data) has been compromised. The data filter 222 can be programmed to evaluate the data content of the data of the packetized data to determine whether the data has been compromised. In some examples, the data filter 222 can be programmed to provide the packetized data to the second network interface application 134 in response to determining that the data of the packetized data has not been compromised. The second network interface application 134 can be programmed to provide the packetized data to the second security domain 104 for the second process executing therein.

Accordingly, CDI server 106 enables processes (e.g., applications or services) executing on different security domains having different security levels to communicate data between each other securely. Moreover, because the cross domain router 130 uses containers for data routing between the security domains an overall power consumption and computational cost at the CDI server 106 can be reduced. Furthermore, implementing the cross domain router 130 on the CDI server 106 is relatively low-cost compared to hardware-based CDS, highly scalable, and can support any number of security domains. While the example of FIG. 1 illustrates the CDI server 106 managing communication between two security domains, in other examples, the CDI server 106 can be configured to manage communication of data between more than two security domains.

Figure 2:
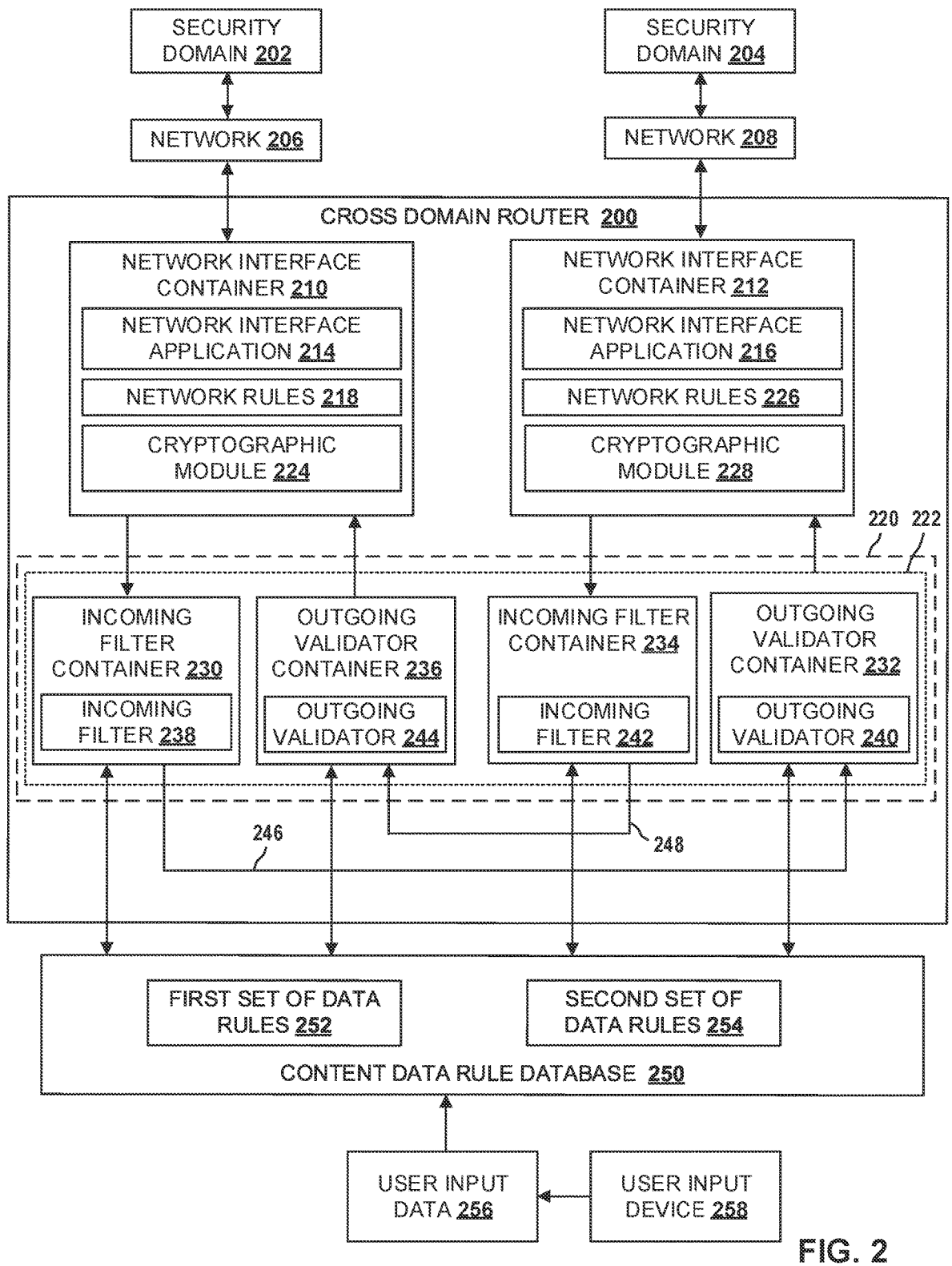
FIG. 2 is an example of a cross domain router.

FIG. 2 is an example of a cross domain router 200. In some examples, the cross domain router 200 is the cross domain router 130, as shown in FIG. 1. Therefore, the following description of FIG. 2 also refers to FIG. 1. The cross domain router 200 can be representative of coded instructions that can be stored in the memory 116 of the CDI server 106. The processor 114 can be configured to access the memory 116 and execute the coded instructions to regulate (e.g., enable and/or restrict) transfer of data between two or more security domains, such as a first security domain 202 and a second security domain 204, as shown in FIG. 2. In some examples, the first security domain 202 is the security domain 102 and the second security domain 204 is the second security domain 104, as shown in FIG. 1. Each of the first and second security domains 202 and 204 can have different security levels, and can include one or more nodes that can be representative of computing devices (e.g., computers, tablets, portable phones, mission deployed systems, etc.). In some examples, the one or more nodes can be representative of virtual computers, such as virtual machines.

In some examples, a first process (e.g., an application or service) can be executed on a first node of the first security domain 202. The process can be programmed to generate data that is to be consumed (e.g., processed) by a second process executing on a second node of the second security domain 204. By way of example, the data generated by a respective node can be a message. Thus, in some examples, the first process can be a messenger application or service. The message can include sensor status information, system status information, mission status information, or other types of status information. The data can be encapsulated into a data packet and transmitted to the CDI server 106 via a first network 206 from the first security domain 202. As disclosed herein, the cross domain router 200 can be programmed to evaluate the data packet relative to a set of network and data rules to determine whether the data packet is permitted to be provided to the second security domain 204. The CDI server 106 can be configured to provide the data packet via a second network 208 to the second security domain 204 for the second process in response to the cross domain router 200 based on the evaluation of the data packet relative to the set of network and data rules, as disclosed herein.

The cross domain router 200 can include a first network interface container 210 and a second network interface container 212. The first network interface container 210 can be the first network interface container 124, the second network interface container 212 can be the second network interface container 126, as shown in FIG. 1. By way of example, during operation (e.g., run time), the first and second network interface containers 210 and 212 can be executed to run respective first and second network interface applications 214 and 216. The first network interface application 214 can be the first network interface application 132, and the second network interface application 216 can be the second network interface application 134, as shown in FIG. 1. The first network interface application 214 can be programmed to evaluate the data packet relative to a first set of network rules 218. The first set of network rules 218 can include data routing rules for the first network 206. The term "set" as used herein with respect to network and data rules can include a single rule or multiple rules. Thus, for example, the first set of network rules 218 can include a single network rule or two or more different network rules. As shown in FIG. 2, the network interface container 210 includes the first set of network rules 218, which can be accessed by the first network interface application 214.

The cross domain router 200 can further include a filter container 220. By way of example, during operation (e.g., run time), the filter container 220 can be executed to run a data filter 222. The filter container 220 can be the filter container 128, as shown in FIG. 1. Thus, in some examples, the data filter 222 is the data filter 136, as shown in FIG. 1. The first network interface application 214 can be programmed to evaluate the data packet relative to the first set of network rules 218 to determine whether the data packet violates at least one network of the first set of network rules 218. The first network interface application 214 can be programmed to provide the data packet to the data filter 222 based on the evaluation of the data packet relative to the first set of network rules 218.

In some examples, the data packet includes a data label and the first set of network rules 218 include one or more label rules. The first network interface application 214 can be programmed to evaluate the data label relative to the one or more label rules to determine whether the data label matches a data label of the one or more label rules. The first network interface application 214 can be programmed to provide the data packet to the data filter 222 in response to determining that the data label for the data matches the data label of the one or more label rules. As disclosed herein, the data filter 222 can be programmed to evaluate a data content of the data of the data packet to determine whether the data has been compromised. By way of example, the data can be referred to as compromised data in response to determining that the data of the data packet include malware, or unwanted code and/or data.

In some examples, the network interface container 210 can be executed to run a cryptographic module 224. While the example of FIG. 2 shows the cryptographic module 224 separate from the first network interface application 214, in some examples, the first network interface application 214 can include the cryptographic module 224. In examples wherein the data packet is encrypted, the cryptographic module 224 can be programmed to decrypt the data packet for evaluation relative to the first set of network rules 218. The cryptographic module 224 can be programmed to encrypt and decrypt data packets based on a two-way authentication scheme between the cryptographic module 224 and a respective cryptographic module executing on a respective node of the first security domain 202. Thus, in some examples, the first node can be configured to encrypt the data packet to provide an encrypted data packet via the first network 206 to the CDI server 106, which can be decrypted by the cryptographic module 224. In some examples, the two-way authentication is a mutual transport layer authentication (mTLS). In some examples, an mTLS certificate can be derived by the cryptographic module 224 (and the respective node of the first security domain 202) from a root certificate authority located on the first network 206 to enable the CDI server 106 and thus the first network interface application 214 to securely communicate with one or more nodes of the first security domain 202, such as the first node. In some examples, the first security domain 202 can include the first network 206. In additional or alternative examples, the second security domain 204 can include the second network 208.

By way of further example, the data filter 222 can be programmed to provide the data packet to the second network interface application 216 in response to determining that the data has not been compromised, as disclosed herein. The second network interface application 216 can be programmed to evaluate the data packet relative to a second set of network rules 226. As shown in FIG. 2, the network interface container 212 includes the second set of network rules 226, which can be accessed by the second network interface application 216. The second set of network rules 226 can include data routing rules for the second network 208. The second set of network rules 226 can be different from the first set of network rules 218 and can be based on a security level of a respective security domain. For example, the first security domain 202 can be designated as a top-secret security domain and the second security domain 204 can be designated as a secret security domain. The top-secret security domain can have one set of network rules, and the secret security domain can have another set of network rules that can be based on the security level of the respective security domain. Thus, in some examples, the first and second security domains 202 and 204 can have different network rules. Each of the first and second network rules 218 and 226 can vary based on a type of data, and type of data that can be provide to a respective security domain. In some examples, at least one of the first and second set of network rules 218 and 216 may include message type rules (e.g., health, status, etc.) that can be provided to a respective security domain. A respective network interface application can be programmed to pass messages with data of a particular message type based on a respective set of network rules and block all other message types.

In some examples, as disclosed herein, the data packet can include a data label. The second set of network rules 226 can include one or more label rules. The second network interface application 216 can be programmed to evaluate the data label relative to the one or more label rules to determine whether the data label matches a data label of the one or more label rules. The second network interface application 216 can be programmed to provide the data packet via the second network 208 to the second security domain 204 in response to determining that the data label for the data matches the data label of the one or more label rules.

In some examples, the network interface container 212 can be executed to run a cryptographic module 228. While the example of FIG. 2 shows the cryptographic module 228 separate from the second network interface application 216, in some examples, the second network interface application 216 can include the cryptographic module 228. The cryptographic module 228 can be programmed to encrypt and decrypt data packets based on a two-way authentication scheme between the cryptographic module 228 and a respective cryptographic module executing on a respective node of the second security domain 204. For example, the cryptographic module 228 can be programmed to encrypt the data packet in response to the second network interface application 216 determining that the data packet does not violate the second set of network rules 226. In some examples, the two-way authentication is an mTLS. In some examples, an mTLS certificate can be derived by the cryptographic module 228 (and the respective node of the second security domain 204) from a root certificate authority located on the second network 208 to enable the CDI server 106 and thus the second network interface application 216 to securely communicate with one or more nodes of the second security domain 204, such as the second node.

In some examples, the data packet originating at the first security domain 202 can be referred to herein as a first data packet. By way of example, a second data packet can be generated by the second process (e.g., an application or service) executing on the second node of the second security domain 204. The process can be programmed to generate data that is to be consumed (e.g., processed) by the first process executing on the first node of the first security domain 202. By way of example, the data generated by the respective node can be a message, such as disclosed herein. The data can be encapsulated at the second security domain 204 to form the second data packet and transmitted to the CDI server 106 via the second network 208.

The second network interface application 216 can be programmed to evaluate the second data packet relative to the second set of network rules 226 to determine whether the second data packet violates at least one network of the second set of network rules 226 in a same or similar manner as disclosed herein with respect to the first data packet. The second network interface application 216 can be programmed to provide the second data packet to the data filter 222 in response to determining that the second data packet does not violate the second set of network rules 226. In examples wherein the second data packet is encrypted, the cryptographic module 228 can be programmed to decrypt the second data packet for evaluation relative to the second set of network rules 226 in a same or similar manner as disclosed with respect to the first data packet.

In some examples, the data filter 222 can be programmed to provide the second data packet to the first network interface application 214 in response to determining that the data of the second data packet has not been compromised in a same or similar manner as disclosed herein with respect to the first data packet. The first network interface application 214 can be programmed to provide the second data packet via the first network 206 to the first security domain 202 for the first process based on an evaluation of the second data packet relative to the first set of network rules 218 in a same or similar manner as disclosed herein with respect to the first data packet.

In some examples, the filter container 220 can include a first incoming filter container 230, a first outgoing validator container 232, a second incoming filter container 234, and a second outgoing validator container 236. In some examples, the first incoming filter container 230, the first outgoing validator container 232, the second incoming filter container 234, and the second outgoing validator container 236 can be executed on the CDI server 106. In some examples, the first incoming filter container 230, the first outgoing validator container 232, the second incoming filter container 234, and the second outgoing validator container 236 can collectively be referred to as the filter container 220. As such, in some examples, the first incoming filter container 230 can be executed to run a first incoming filter 238, the first outgoing validator container 232 can be executed to run a first outgoing validator 240, the second incoming filter container 234 can be executed to run a second incoming filter 242, and the second outgoing validator container 236 can be executed to run a second outgoing validator 244. In some examples, the first incoming filter 238, the first outgoing validator 240, the second incoming filter 242, and the second outgoing validator 244 can collectively be referred to as the data filter 222.

As shown in FIG. 2, a first data path 246 (e.g., data pipe) can be established to provide a one-way data path between the first incoming filter 238 and the first outgoing validator 240, and a second data path 248 (e.g., data pipe) can be established to provide a one-way data path between the second incoming filter 242 and the second outgoing validator 244. The first incoming filter 238 can be programmed to receive the first data packet from the first network interface application 214. The first incoming filter 238 can be programmed to communicate with a content data rule database 250. As shown in FIG. 2, the content data rule database 250 is located outside the cross domain router 200, and thus the filter container 220. For example, the first incoming filter 238 can be programmed to query the content data rule database 250 for a first set of data rules 252. In some examples, the content data rule database 250 is stored in the memory 116 of the CDI server 106. In other examples, the content data rule database 250 is located external to the CDI server 106 and can be queried as disclosed herein to retrieve data rules.

The first set of data rules 252 can include one or more data content rules identifying types of content and thus data that can be provided from the first security domain 202 to the second security domain 204. In some examples, the first set of data rules 252 can include malware signature or rules for detecting different types of malware that can be embedded within data of one or more data packets originating at the first security domain 202. The first incoming filter 238 can be programmed to evaluate a data content of the data of the first data packet relative to the first set of data rules 252 to determine if the data has been compromised. In some examples, the first incoming filter 238 can be programmed to evaluate the data content of the data of the first data packet relative to the first set of data rules 252 to determine if the type of data within the data packet can be provided to the second security domain 204.

The first incoming filter 238 can be programmed to communicate the first data packet via the first data path 246 to the first outgoing validator 240 in response to determining that the data content of the data of the first data packet does not violate the first set of data rules 252. In some examples, the first outgoing validator 240 can be programmed to communicate with the content data rule database 250. The first outgoing validator 240 can be programmed to query the content data rule database 250 for the first set of data rules 252. The first outgoing validator 240 can be programmed to evaluate the data content of the data of the first data packet relative to the first set of data rules 252 in a same or similar manner as the first incoming filter 238. Thus, both the first incoming filter 238 and the first outgoing validator 240 can be programmed to evaluate the first data packet based on a similar set of data rules. In some examples, the first incoming filter 238 can have a different code base than the first outgoing validator 240. In some examples, a malware attack can cause one of the first incoming filter 238 and the first outgoing validator 240 to go offline. Because the first incoming filter 238 and the first outgoing validator 240 can have different code bases (e.g., coded by different developers), a remaining filter or validator can remain functional and online, and thus can protect against leakage of data from a respective security domain to another security domain, or malware infiltrating a given security domain.

In some examples, the second incoming filter 242 can be programmed to receive the second data packet from the second network interface application 216. The second incoming filter 242 can be programmed to communicate with the content data rule database 250. For example, the second incoming filter 242 can be programmed to query the content data rule database 250 for a second set of data rules 254. The second set of data rules 254 can include one or more data content rules identifying types of content and thus data that can be provided from the second security domain 204 to the first security domain 202. In some examples, the second set of data rules 254 can include malware signature or rules for detecting different types of malware that can be embedded within data of one or more data packets originating at the second security domain 204. The second incoming filter 242 can be programmed to evaluate a data content of the data of the second data packet relative to the second set of data rules 254 to determine if the data has been compromised. In some examples, the second incoming filter 242 can be programmed to evaluate the data content of the data of the second data packet relative to the second set of data rules 254 to determine if the type of data within the second data packet can be provided to the first security domain 202.

The second incoming filter 242 can be programmed to communicate the second data packet via the second data path 248 to the second outgoing validator 244 in response to determining that the data content of the data of the second data packet does not violate the second set of data rules 254. In some examples, the second outgoing validator 244 can be programmed to communicate with the content data rule database 250. The second outgoing validator 244 can be programmed to query the content data rule database 250 for the second set of data rules 254. The second outgoing validator 244 can be programmed to evaluate the data content of the data of the second data packet relative to the second set of data rules 254 in a same or similar manner as the second incoming filter 242. Thus, both the second incoming filter 242 and the second outgoing validator 244 can be programmed to evaluate the second data packet based on a similar set of data rules.

In some examples, the second incoming filter 242 can have a different code base than the second outgoing validator 244. In some examples, a malware attack can cause one of the second incoming filter 242 and the second outgoing validator 244 to go offline. Because the second incoming filter 242 and the second outgoing validator 244 can have different code bases (e.g., coded by different developers), a remaining filter or validator can remain functional and online, and thus can protect against leakage of data from a respective security domain to another security domain, or malware infiltrating a given security domain. By way of example, at least one of the first set of data rules 252 and the second set of data rules can include a field validation rule, a field removal rule, and other types of rules.

Accordingly, the cross domain router 200 enables processes (e.g., applications or services) executing on different security domains having different security levels to communicate data between each other securely. Moreover, because the cross domain router 200 uses containers for data routing between the security domains an overall power consumption and computational cost at the CDI server 106 can be reduced. Furthermore, implementing the cross domain router 200 on the CDI server 106 is relatively low-cost compared to hardware-based CDS, highly scalable, and can support any number of security domains. While the example of FIG. 2 illustrates the cross domain router 200 managing communication between two security domains, in other examples, the cross domain router 200 can be configured to manage communication of data between more than two security domains.

Moreover, because the content data rule database 250 is located outside the filter container 128 and thus outside respective containers 230, 232, 234, and 236, the respective containers 230, 232, 234, and 236 no longer needed to re-validated following an update or change to data rules to ensure that the respective containers 230, 232, 234, and 236 comply with a security standard (e.g., as set forth by an entity or organization, such as a government agency). Thus, the respective containers 230, 232, 234, and 236 do not need to go through a formal verification or certification process after being initially certified in response to changes to the data rules. This is because the respective containers 230, 232, 234, and 236 are programmed to allow for communication with the content data rule database 250 storing the data rules that are located outside of the cross domain router 200, and thus the respective containers 230, 232, 234, and 236. As such, the data rules of the content data rule database 250 can be updated based on user input data 256, which can be provided based on user input at a user input device 258 (e.g., such as a keyboard). Accordingly, a user can modify and update the data rules without being required to recertify respective containers 230, 232, 234, and 236. Furthermore, while the example of FIG. 2 illustrates the cross domain router 200 managing data flow between two security domains, in other examples, the cross domain router 200 can be configured to manage data flow between more than two security domains.

Figure 3:
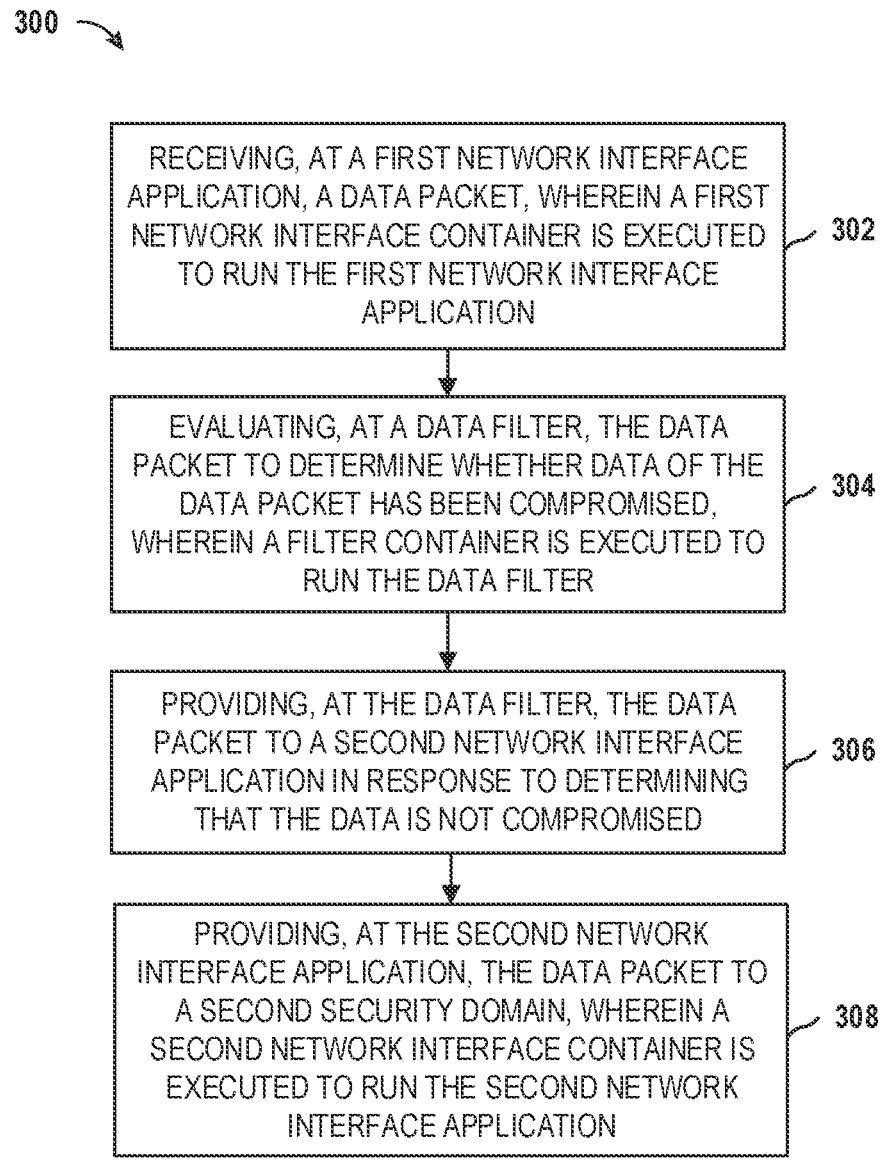
FIG. 3 is an example of a method for communicating data between first and second security domains.
Figure 4:
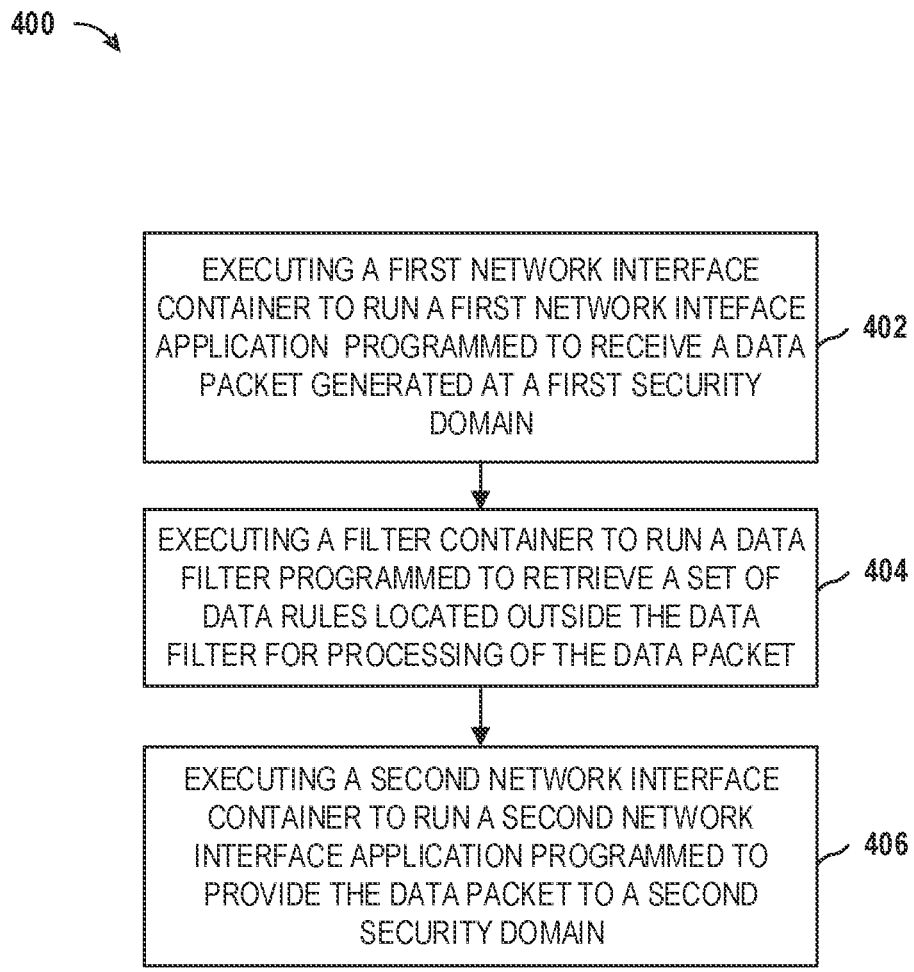
FIG. 4 is another example of a method for communicating data between first and second security domains.

In view of the foregoing structural and functional features described above, example methods will be better appreciated with references to FIGS. 3-4. While, for purposes of simplicity of explanation, the example methods of FIGS. 3-4 are shown and described as executing serially, it is to be understood and appreciated that the example method is not limited by the illustrated order, as some actions could in other examples occur in different orders, multiple times and/or concurrently from that shown and described herein.

FIG. 3 is an example of a method 300 for communicating data between first and second security domains, such as the first and second security domains 102 and 104, as shown in FIG. 1. The method 300 can be implemented by the cross domain router 130, as shown in FIG. 1, or the cross domain router 200, as shown in FIG. 2. Therefore, the following description of FIG. 3 also refers to FIGS. 1-2. The method 300 can begin at 302 by receiving, at a first network interface application (e.g., the first network interface application 132, as shown in FIG. 1), a data packet generated at a first security domain (e.g., the first security domain 102, as shown in FIG. 1). A first network interface container (e.g., the first network interface container 124, as shown in FIG. 1) can be executed on a CDI server (e.g., the CDI server 106, as shown in FIG. 1) to run the first network interface application. At 304, evaluating, at a data filter (e.g., the data filter 136, as shown in FIG. 1), a data content of the data to determine whether the data has been compromised. A filter container (e.g., the filter container 128, as shown in FIG. 1) can be executed on the CDI server to run the data filter. At 306, providing, at the data filter, the data packet to a second network interface application in response to determining that the data has not been compromised. A second network interface container (e.g., the second network interface container 128, as shown in FIG. 1) can be executed on the CDI server to run the first network interface application. At 308, providing, at the second network interface application, the data packet to a second security domain (e.g., the second security domain 104, as shown in FIG. 1) for a second process executing at the second security domain.

FIG. 4 is an example of a method 400 for communicating data between first and second security domains, such as the first and second security domains 102 and 104, as shown in FIG. 1. The method 400 can be implemented by the cross domain router 130, as shown in FIG. 1, or the cross domain router 200, as shown in FIG. 2. Therefore, the following description of FIG. 4 also refers to FIGS. 1-2. The method 400 can begin at 402 by executing a first network interface container (e.g., the first network interface container 124, as shown in FIG. 1) on a CDI server (e.g., the CDI server 106, as shown in FIG. 1) to run a first network interface application (e.g., the first network interface application 132, as shown in FIG. 1). The first network interface application can be programmed to receive a data packet generated at a first security domain (e.g., the first security domain 102, as shown in FIG. 1) from a first network (e.g., the first network 108, as shown in FIG. 1). The data packet can include data generated by a first process executing at the first security domain.

At 404, executing a filter container (e.g., the filter container 128, as shown in FIG. 2) on the CDI server to run a data filter (e.g., the data filter 136, as shown in FIG. 1). The data filter can be programmed to query a content data rule database (e.g., the content data rule database 250, as shown in FIG. 2) located outside the filter container to retrieve a set of data rules and determine whether a data content of the data of the data packet has been compromised based on the set of data rules. At 406, executing a second network interface container (e.g., the second network interface container 126, as shown in FIG. 1) on the CDI server to run a second network interface application (e.g., the second network interface application 134, as shown in FIG. 1). The second network interface application can be programmed to provide the data packet to a second security domain (e.g., the second security domain 104, as shown in FIG. 1) over a second network (e.g., the second network 110, as shown in FIG. 1) for a second process executing at the second security domain.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. A computer-implemented method comprising:
receiving, at a first network interface application, a data packet generated at a first security domain, wherein a first network interface container is executed to run the network interface application, and the data packet includes data generated by a first process executing at the first security domain;

evaluating, at a data filter, a data content of the data to determine whether the data has been compromised, wherein a filter container is executed to run the data filter;

providing, at the data filter, the data packet to a second network interface application in response to determining that the data has not been compromised, wherein a second network interface container is executed to run the second network interface application; and providing, at the second network interface application, the data packet to a second security domain for a second process executing at the second security domain.

2. The computer-implemented method of claim 1, further comprising:

evaluating, at the first network interface application, the data packet relative to a set of network rules for a network to determine whether the data packet violates at least one network rule of the set of network rules; and providing, at the first network interface application, the data packet to the data filter in response to determining that the data packet does not violate the set of network rules.

3. The computer-implemented method of claim 2, wherein the set of network rules is a first set of network rules, and the network is a first network, the method further comprising:

evaluating, at the second network interface application, the data packet relative to a second set of network rules for a second network to determine whether the data packet violates at least one network rule of the second set of network rules; and providing, at the second network interface application, the data packet to the second security domain for the second process executing at the second security domain in response to determining that the data packet does not violate the second set of network rules.

4. The computer-implemented method of claim 3, wherein the data filter is configured to evaluate the data content of the data relative to a set of data rules to determine whether the data has been compromised.

5. The computer-implemented method of claim 4, further comprising executing, at a cross-domain interface (CDI) server, coded instructions representative of a cross domain router for communicating data packets between the first and second security domains, wherein the cross domain router includes the first and second network interface containers, and the filter container.

6. The computer-implemented method of claim 5, wherein the first and second network interface containers, and the filter container are assembled into a pod.

7. The computer-implemented method of claim 5, wherein the CDI server comprises memory for storing the coded instructions representative of the cross domain router, the method further comprising storing in the memory a content data rule database comprising the set of data rules for determining whether the data of the data packet has been compromised, wherein the content data rule database is located outside of the filter container.

8. The computer-implemented method of claim 7, querying, at the data filter, the content data rule database to retrieve the set of data rules for determining whether the data of the data packet has been compromised.

9. The computer-implemented method of claim 8, wherein the data packet is a first data packet, the method further comprising:

receiving, at the content data rule database, an updated set of data rules based on a user input;

querying, at the data filter, the content data rule database to retrieve the updated set of data rules for determining whether data within a second data packet is generated at the first security domain has been compromised;

evaluating, at the data filter, a data content of the data of the second data packet to determine whether the data of the second data packet has been compromised;

providing, at the data filter, the second data packet to the second network interface application in response to determining that the data of the second data packet has not been compromised; and providing, at the second network interface application, the second data packet to the second security domain.

10. A system comprising:

memory to store machine-readable instructions representative of a cross domain router for communicating data packets between first and second security domains, and data comprising a content data rule database comprising a set of data rules for determining whether data within one or more data packets has been compromised; and one or more processors to access the memory and execute the machine-readable instructions to execute a first network interface container to run a first network interface application, a second network interface container to run a second network interface application, and a filter container to run a data filter, the first network interface application being programmed to receive a data packet generated at the first security domain, the data packet including data generated by a first process executing at the first security domain, the data filter being programmed to query the content data rule database to retrieve the set of data rules and provide the data packet to the second network interface application in response to determining that a data content of the data does not violate the set of data rules, and the second network interface application being programmed to provide the data packet to the second security domain for a second process executing at the second security domain.

11. The system of claim 10, wherein the first network interface container comprise a set of network rules for a network, the first network interface application being programmed to:

evaluate the data packet relative to the set of network rules to determine whether the data packet violates at least one network rule of the set of network rules; and provide the data packet to the data filter in response to determining that the data packet does not violate the set of network rules.

12. The system of claim 11, wherein the set of network rules is a first set of network rules, and the network is a first network, and the second network interface container comprise a second set of network rules for a second network, the second network interface application being programmed to evaluate the data packet relative to the second set of network rules to determine whether the data packet violates at least one network rule of the second set of network rules, the second network interface application being programmed to provide the data packet to the second security domain for the second process executing at the second security domain in response to determining that the data packet does not violate the second set of network rules.

13. The system of claim 12, wherein the data packet is a first data packet, and the second network interface application is programmed to:
- receive a second data packet generated at the second security domain, the second data packet can include data generated by the second process executing at the second security domain;
- evaluate the second data packet relative to the second set of network rules to determine whether the second data packet violate at least one network rule of the second set of network rules; and
- provide the second data packet to the data filter in response to determining that the second data packet does not violate the second set of network rules.

14. The system of claim 13, wherein the set of data rules is a first set of data rules, the content data rule database comprising a second set of data rules for determining whether data of the second data packet generated by the second process has been compromised.

15. The system of claim 14, wherein the data filter is programmed to:
- query the content data rule database to retrieve the second set of data rules; and
- provide the second data packet to the first network interface application in response to determining that a data content of the data of the second data packet does not violate the second set of data rules.

16. The system of claim 15, wherein the first network interface application is programmed to provide the second data packet to the first security domain for the first process executing at the first security domain.

17. The system of claim 16, wherein the filter container comprises an incoming filter container and an outgoing validator container, the machine-readable instructions being executed by the processor to execute the incoming filter container to run an incoming filter and the outgoing validator container to run an outgoing validator, the data filter comprising the incoming filter and the outgoing validator,
- the incoming filter being programmed to provide the first data packet to the outgoing validator in response to determining that the data content of the data of the first data packet does not violate the first set of data rules, and
- the outgoing validator being programmed to provide the first data packet to the second network interface application in response to determining that the data content of the data of the first data packet does not violate the first set of data rules.

18. The system of claim 17, wherein the incoming filter container is a first incoming filter container, the outgoing validator container is a first outgoing validator container, the filter container is a first filter container, and the outgoing validator container is a first outgoing validator container, the filter container further comprising a second filter container and a second outgoing validator container, the machine-readable instructions being executed by the processor to execute the second incoming filter container to run a second incoming filter and the second outgoing validator container to run a second outgoing validator, the data filter comprising the second incoming filter and the second outgoing validator,
- the second incoming filter being programmed to provide the second data packet to the second outgoing validator in response to determining that the data content of the data of the second data packet does not violate the second set of data rules, and
- the outgoing validator being programmed to provide the second data packet to the first network interface application in response to determining that the data content of the data of the second data packet does not violate the second set of data rules.

19. A computer-implemented method comprising:
- executing a first network interface container on a cross domain interface (CDI) server to run a first network interface application, the first network interface application being programmed to receive a data packet generated at a first security domain from a first network, the data packet including data generated by a first process executing at the first security domain;
- executing a filter container on the CDI server to run data filter, the data filter being programmed to query a content data rule database located outside the filter container on the CDI server to retrieve a set of data rules and determine whether a data content of the data of the data packet has been compromised based on the set of data rules; and
- executing a second network interface container on the CDI server to run a second network interface application, the second network interface application being programmed to provide the data packet to a second security domain over a second network for a second process executing at the second security domain.

20. The computer-implemented method of claim 19, further comprising storing the set of data rules in the content data rule database, wherein the set of data rules are generated based on user input data.

* * * * *